(12) United States Patent
Edwards (10) Patent No.: US 7,785,689 B2
(45) Date of Patent: Aug. 31, 2010

(54) RAW MATERIAL CONSERVING OPTICAL DATA STORAGE MEDIA

(75) Inventor: Jathan D. Edwards, Afton, MN (US)

(73) Assignee: Imation Corp., Oakdale, MN (US)

( * ) Notice: Subject to any disclaimer, the term of this patent is extended or adjusted under 35 U.S.C. 154(b) by 865 days.

(21) Appl. No.: 11/507,812

(22) Filed: Aug. 21, 2006

(65) Prior Publication Data

US 2008/0044615 A1 Feb. 21, 2008

(51) Int. Cl.
*B32B 3/02* (2006.01)
*G11B 3/70* (2006.01)
*G11B 7/24* (2006.01)

(52) U.S. Cl. ............... 428/64.4; 369/275.1; 369/275.2; 369/275.3; 369/275.4; 369/272.1

(58) Field of Classification Search ............ 369/275.1, 369/275.4, 275.3, 275.5, 272.1, 275.2, 273; 428/64.4, 64.1; 430/321
See application file for complete search history.

(56) References Cited

U.S. PATENT DOCUMENTS

| | | | |
|---|---|---|---|
| 4,980,881 A | 12/1990 | Beaujean | |
| 6,680,898 B2 * | 1/2004 | Kuchman | 369/275.4 |
| 7,389,520 B2 | 6/2008 | Hayashi et al. | |
| 2002/0141315 A1 | 10/2002 | Okada | |
| 2004/0170116 A1 * | 9/2004 | Moloo et al. | 369/275.4 |
| 2004/0228262 A1 * | 11/2004 | Bigley | 369/275.3 |
| 2005/0018583 A1 * | 1/2005 | Worthington et al. | 369/103 |
| 2005/0018589 A1 * | 1/2005 | Mizushima et al. | 369/275.2 |
| 2005/0169147 A1 * | 8/2005 | Kobayashi et al. | 369/53.35 |

FOREIGN PATENT DOCUMENTS

| | | |
|---|---|---|
| CN | 2550876 Y | 5/2003 |
| JP | 54-055445 | 5/1979 |
| JP | 61-094248 | 5/1986 |
| JP | 11-053764 | 2/1999 |

* cited by examiner

*Primary Examiner*—Hoa T Nguyen
*Assistant Examiner*—Andrew J Sasinowski
(74) *Attorney, Agent, or Firm*—Shumaker & Sieffert, P.A.

(57) ABSTRACT

The invention provides for modifications to conventional optical data storage media to reduce the amount of raw material necessary in the media construction. More particularly, a portion of a thermoplastic substrate is modified to create one or more substantial void areas compared to a conventional substrate that defines flat parallel surfaces without void areas. The configuration, number, and size of the voids may be modified in order to substantially reduce inherent raw material cost while maintaining the specified physical thickness, clamping area, and mechanical stability of the medium.

28 Claims, 4 Drawing Sheets

RAW MATERIAL CONSERVING OPTICAL DATA STORAGE MEDIA

TECHNICAL FIELD

The invention relates to optical data storage media.

BACKGROUND

Optical data storage disks have gained widespread acceptance for the storage, distribution and retrieval of large volumes of information. Optical data storage disks include, for example, audio CD (compact disc), CD-R (CD-recordable), CD-RW (CD-rewritable) CD-ROM (CD-read only memory), DVD (digital versatile disk or digital video disk), DVD-RAM (DVD-random access memory), HD-DVD (high definition-DVD), Blu-ray, and various other types of writable or rewriteable media, such as magneto-optical (MO) disks, phase change optical disks, and others. Some newer formats for optical data storage disks are progressing toward smaller disk sizes and increased data storage density. For example, some new media formats boast reduced track pitch, increased storage through multiple data layers and increased storage density using blue-wavelength lasers for data readout and/or data recording.

Optical data storage disks are typically produced by first making a data storage disk master that has a surface pattern that represents encoded data and/or precision tracking features on the master surface. The surface pattern, for instance, may be a collection of precisely dimensioned grooves or other features that define master pits and master lands, e.g., typically arranged in either a spiral or concentric manner. The master is typically not suitable as a mass replication surface, as the master features are typically defined within an etched photoresist layer formed over a master substrate.

After creating a suitable master, that master can be used to make a stamper, which is less fragile than the master. The stamper is typically formed of electroplated metal or a hard plastic material, and has a surface pattern that is the inverse of the surface pattern encoded on the master. An injection mold can use the stamper to fabricate large quantities of replica disks. Also, photopolymer replication processes, such as rolling bead processes, have been used to fabricate replica disks using stampers. In any case, each replica disk may contain the data and tracking precision that was originally encoded on the master surface and preserved in the stamper. The replica disks can be coated with a reflective layer and/or a phase change layer, and are often sealed with an additional protective layer. Additional stampers (later generation stampers) can also be made from the first generation stamper, to improve productivity with respect to one original master, or to allow for master features to be formed as the inverse of the desired replica disk features.

Some types of optical data storage disks contain multiple substrates bonded together. For example, DVD and HD-DVD media constructions are composed of two substrates, both with the thickness of approximately 0.6 millimeters. Typically, one of the substrates bears the data and/or tracking information, while the other non-information substrate provides the functions of backside protection, reference clamping area, a labeling area, and improved mechanical stability. In these types of bonded media constructions, the information-bearing surface is sandwiched interior to the two substrate bond. As such, the information-bearing surface is interrogated by a drive system using a beam of laser light brought to focus through the information substrate. This, in turn, places strict optical requirements for thickness, thickness uniformity, index of refraction, and birefringence for the information-bearing substrate. The non-information substrate provides backside protection inasmuch as the information-bearing surface is encased between the two bonded substrate elements. The backside of the medium refers to the non-information substrate side of the media which is not interrogated by the drive system laser. The media clamping area refers to the radial portion of the region located between the inner perimeter of the medium and the information area containing the data layers which is designated by the drive specification for a drive clamping reference zone. The clamping area of the media may be used by the drive system to hold the media in fixed relative position to the drive spindle. The non-information substrate also functions to improve robustness of the medium by improving both the dynamic and static mechanical stability. A bonded non-information substrate improves static mechanical stability by minimizing bending stress to the information-bearing surface. Likewise, a properly bonded non-information substrate improves dynamic mechanical runout for the rotating media.

Blu-ray media constructions may likewise be viewed as being composed of two substrate elements, one having a thickness of approximately 1.1 millimeters and another with a thickness of approximately 0.1 millimeters. In this view, the substrate element of greater thickness is fabricated with an information-bearing surface including data and/or precision tracking information and the substrate of lesser thickness covers the information-bearing surface to provide protection and defocusing of surface contamination. This substrate of lesser thickness is often referred to as a cover layer. In this media construction, the thicker substrate element provides the functionality of information bearing as well as providing functions of backside protection, clamping area and improved mechanical stability. The beam of laser light interrogates the information-bearing surface for this media construction through the cover layer. This, in turn, places strict optical requirements such as thickness, thickness uniformity, index of refraction, and birefringence on the cover layer.

Different types of optical data storage media may also vary based on the distance between the data and the objective lens of the reading mechanism. With DVD and HD-DVD, the data layer is located approximately 0.6 millimeters in from the surface of the disk closest to the laser. With Blu-ray, the data layer is located approximately 0.1 millimeters in from the surface of the disk closest to the laser. During reading and recording, the laser beam passes through the portion of the disk located between the laser and the data layer. This portion of the disk, the optically functional portion, must adhere to specified requirements in regard to optical thickness, optical thickness uniformity, allowable thickness range, allowable birefringence, and range of optical index of refraction for the material.

Air incident optical data storage disks may contain a data layer that is located on the surface of the disk closest to the laser. Since this type of medium does not have additional disk layers located between the data layer and the laser, the distance between the data and the objective lens of the reading mechanism can be very short. Also, since the laser beam does not pass through any additional disk layers prior to the data layer, a large portion of these disks may be non-optically functional. The non-optically functional portion of the disk, defined as the portion that the laser beam does not pass through, however, can still provide backside protection, clamping area, and improved mechanical stability.

SUMMARY

In general, the invention provides for modifications to conventional optical data storage media to reduce the amount of raw material necessary in the media construction. More particularly, a portion of a thermoplastic substrate is modified to create one or more substantial void areas compared to a conventional substrate that defines flat parallel surfaces without void areas. The configuration, number, and size of the voids may be modified in order to substantially reduce inherent raw material cost while maintaining the specified physical thickness, clamping area, and mechanical stability of the medium.

In one embodiment, the invention is directed to an optical data storage medium comprising a first thermoplastic substrate defining a first side and a second side; and a second thermoplastic substrate defining a first side and a second side, wherein the first side of the first substrate is incident to a laser when the medium is read through the first substrate, the second side of the first substrate defines an information-bearing surface that is read through the first substrate, and the second side of the second substrate includes one or more substantial void areas.

In another embodiment, the invention is directed to an optical data storage medium comprising a first thermoplastic substrate defining a first side and a second side; and a second thermoplastic substrate defining a first side and a second side, wherein the first side of the first substrate is incident to a laser when the medium is read through the first substrate, the first side of the second thermoplastic substrate defines an information-bearing surface that is read through the first substrate, and the second side of the second thermoplastic substrate includes one or more substantial void areas.

In another embodiment, the invention is directed to a thermoplastic substrate of an optical data storage medium defining a first side and a second side, wherein the second side includes one or more substantial void areas.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
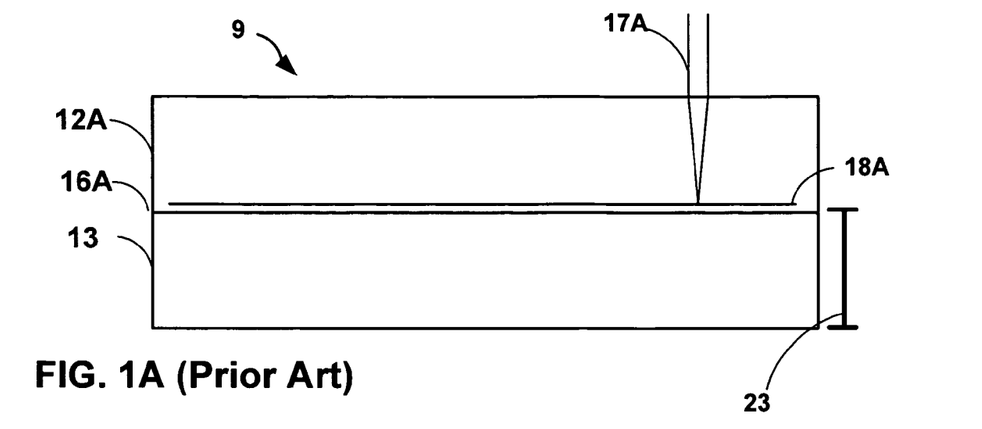
FIGS. 1A-1C are illustrations showing an optical data storage medium according to the invention with two substrates bonded together.
Figure 1B:
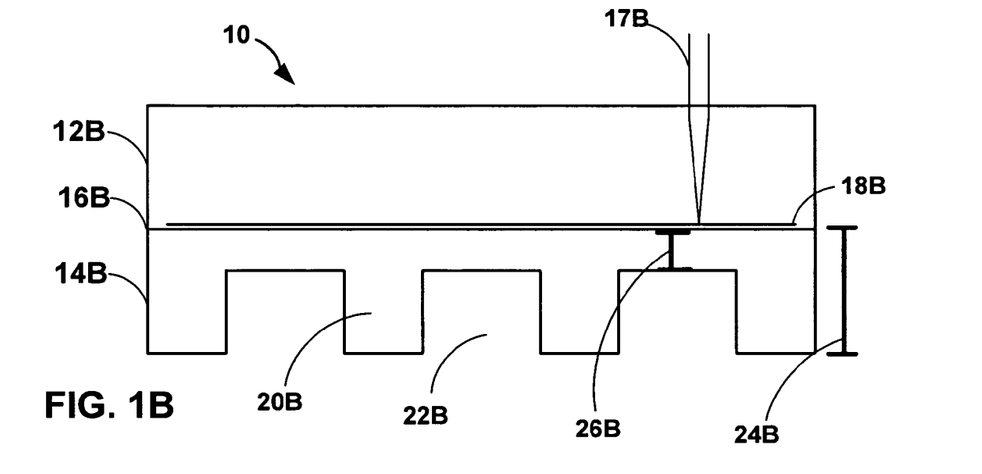
Figure 1C:
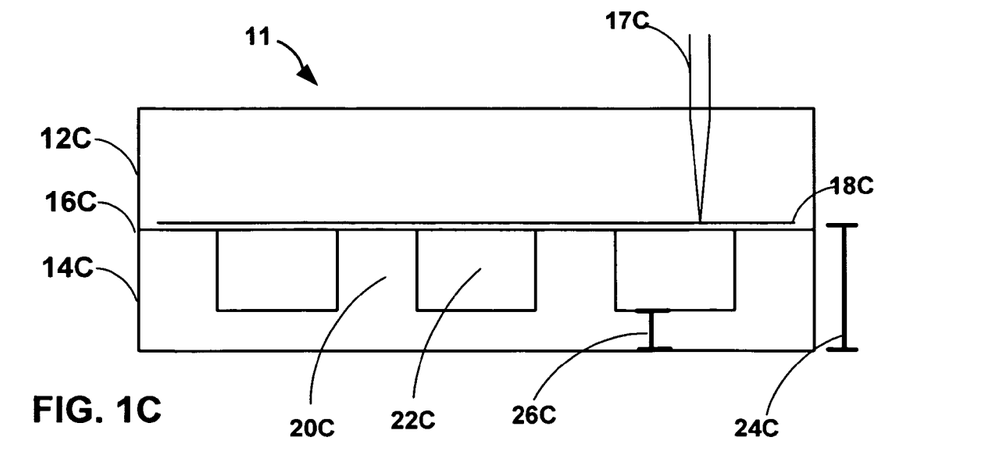

FIGS. 1A-1C are illustrations showing an optical data storage medium with two substrates bonded together. FIG. 1A shows the prior art structure of conventional optical data storage medium 9. FIGS. 1B and 1C show modified optical data storage media 10 and 11. Optical data storage media 9, 10 and 11 contain two substrates, and may represent DVD or HD-DVD media or any other format that uses two bonded substrates. In conventional optical data storage medium 9, a first substrate 12A is bonded to a second conventional substrate 13 along plane 16A. In optical data storage media 10 and 11, substrates 12B and 12C are bonded to modified substrates 14B and 14C along planes 16B and 16C, respectively. Data layers 18A, 18B, and 18C (collectively data layers 18) are located on substrates 12A, 12B, and 12C, respectively. The locations of data layers 18A, 18B, and 18C are not limited to the locations shown in these embodiments and may be located farther from or closer to planes 16A, 16B, and 16C, respectively. Data layers 18 may also comprise multiple data layers, and each data layer may further comprise reflective, phase change, and/or dye layers. Laser beams 17A, 17B, and 17C travel through substrates 12A, 12B, and 12C to data layers 18A, 18B, and 18C, respectively; and therefore, substrates 12A, 12B, and 12C are optically functional and must adhere to specified requirements in regard to optical thickness, optical thickness uniformity, allowable thickness range, allowable birefringence, and range of optical index of refraction for the material.

Conventional substrate 13 may provide backside protection, clamping area and mechanical stability. Modified substrates 14B and 14C may also provide these same features. On the modified optical data storage media 10 and 11, modified substrates 14B and 14C contain ridges 20B and 20C and void areas 22B and 22C, respectively. Conventional substrate 13 of conventional optical data storage medium 9 defines flat, parallel surfaces without void areas. Since lasers beams 17B and 17C do not pass through modified substrates 14B and 14C, modified substrates 14B and 14C may be non-optically functional and do not require tight adherence to optical thickness, optical thickness uniformity, and range of optical index of refraction regulations. This allows modified substrates 14B and 14C to contain ridges 20B and 20C and void areas 22B and 22C without compromising data reading or resulting in non-compliance media.

The configuration, number, and size of the void areas 22B and 22C are not limited to the embodiment shown in FIG. 1. As will be described further in the description of FIG. 4, these characteristics may be modified in order to substantially reduce inherent raw material cost while maintaining the specified physical thickness, clamping area, protection and mechanical stability of the medium. Ridges 20B and 20C have thicknesses 24B and 24C, and void areas 22B and 22C have thicknesses 26B and 26C, respectively. Ridge thicknesses 24B and 24C may be approximately equal to conventional substrate thickness 23. This allows modified optical data storage media 10 and 11 to conform to the preexisting thickness requirements for optical data storage media. With ridge thicknesses 24B and 24C approximately equal to conventional substrate thickness 23, conventional substrate 13 and modified substrates 14B and 14C will all have approximately equal maximum thicknesses. Therefore, modified substrates 14B and 14C comply with the maximum thickness standard. Additionally, ridge thickness 24B is greater than void thickness 22B, and ridge thickness 24C is greater than void thickness 22C. Void thicknesses 22B and 22C may each be approximately ten to eighty-five percent of conventional substrate thickness 23. Reducing void thicknesses 22B and 22C reduces the amount of the raw materials necessary to construct modified optical data storage media 10 and 11 and the corresponding cost of materials.

In the case of a DVD or HD-DVD, for example, ridge thicknesses 24B and 24C may be approximately equal to 0.6 millimeters, the conventional thickness of a DVD substrate. Having ridge thicknesses 24B and 24C approximately equal to the conventional thickness of a DVD substrate will allow modified optical data storage media 10 and 11 to conform to the specified thickness requirement for DVDs. Void thicknesses 26B and 26C will be less than ridge thicknesses 24B and 24C. Void thicknesses 26B and 26C may be approximately between 0.1 millimeters and 0.5 millimeters.

Modified substrates 14B and 14C contain substantially less material than conventional substrate 13, which defines flat, parallel surfaces without void areas. Void areas 22B and 22C may cover over half of a surface of substrates 14B and 14C, respectively. Consequently, approximately fifteen to ninety percent of conventional substrate thickness 23 may be removed from over half of a surface of substrates 14B and 14C. As a result, modified substrates 14B and 14C has a much smaller volume than conventional substrate 13. For modified substrates 14B and 14C, approximately ten to eighty five percent of volume may be removed when compared to conventional substrate 13.

Less material is needed to construct modified substrates 14B and 14C than conventional substrate 13. For example, constructing a conventional DVD may require approximately six cents worth of polycarbonate materials. A DVD consists of two substrates, both with a thickness of 0.6 millimeter. Therefore, the material cost for one conventional substrate may be approximately three cents. If a modified substrate only requires one third of the material necessary for a conventional substrate, a savings of two cents per DVD can be achieved. This reduces the overall material cost per DVD by one third. If the total cost of producing a DVD is approximately twenty cents, including labor and machine costs. A two cent savings in material costs may decrease the total cost of producing a DVD by approximately ten percent.

FIG. 1B shows the bonding between substrates 12B and 14B occurring such that void areas 22B define a pattern on the outer surface of optical data storage medium 10, yielding an outward appearance that differs from the outer appearance of conventional optical data storage medium 9. This configuration allows for uniform bonding to occur along the length of plane 16B. Uniform bonding may provide advantageous thermal tolerance and corrosion-resistive properties.

Alternatively, FIG. 1C shows the bonding between substrates 12C and 14C occurring such that void areas 22C define a volume inside optical data storage medium 11, yielding an outward appearance that is unchanged compared to the outward appearance of conventional optical data storage medium 9. However, in this configuration, the maximum flex points of optical data storage medium 11 may occur along plane 16C. Ridges 20C may be configured to minimize the flexion along plane 16C. Nevertheless, this configuration in FIG. 1C may provide advantages in terms of appearance and customer acceptance insofar as the disk may look and feel similar to a conventional medium since the void areas are enclosed within the volume of the disk itself.

Figure 2A:
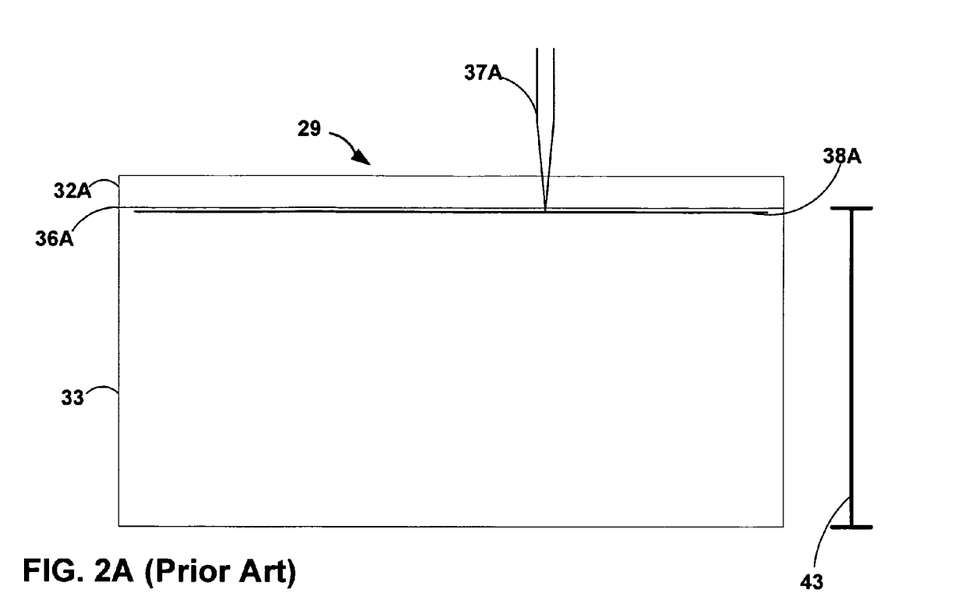
FIGS. 2A and 2B are illustrations showing another embodiment of an optical data storage medium according to the invention with two substrates bonded together.
Figure 2B:
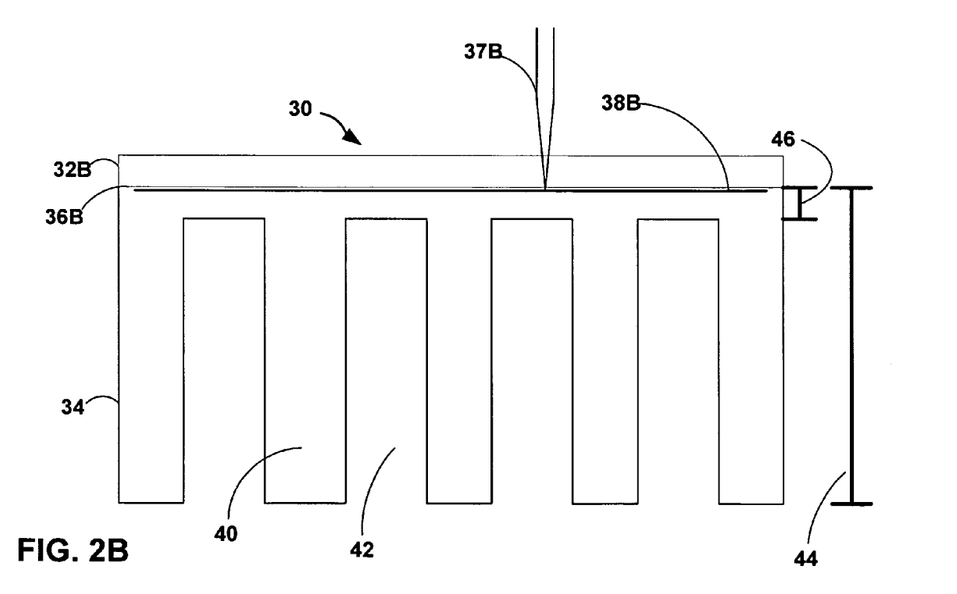

FIGS. 2A and 2B are illustrations showing another embodiment of an optical data storage medium with two substrates bonded together. FIG. 2A shows the prior art structure of conventional optical data storage medium 29. FIG. 2B shows modified optical data storage medium 30. Optical data storage media 29 and 30 contain two substrates, and may represent Blu-ray media. In the case of conventional optical data storage medium 29 shown in FIG. 2A, a first substrate 32A is bonded to a second conventional substrate 33 along plane 36A. In the case of modified optical data storage medium 30 shown in FIG. 2B, a first substrate 32B is bonded to a modified substrate 34 along plane 36B. In conventional optical data storage medium 29, data layer 38A is located on conventional substrate 33. In modified optical data storage medium 30, data layer 38B is located on modified substrate 34. Like data layers 18 of FIG. 1, the locations of data layers 38A and 38B are not limited to the locations shown in these embodiments and may be located farther from or closer to planes 36A and 36B, respectively. Data layers 38A and 38B may also comprise multiple data layers, and each data layer may further comprise reflective, phase change, and/or dye layers.

Substrates 32A and 32B may be thin substrates that respectively cover data layers 38A and 38B with a thin, protective layer. Laser beams 37A and 37B travel through substrates 32A and 32B to data layers 38A and 38B, respectively; and, therefore, substrates 32A and 32B are optically functional and must adhere to specified requirements in regard to optical thickness, optical thickness uniformity, allowable thickness range, and range of optical index of refraction for the material. Substrates 32A and 321B may also be referred to as cover layers.

Conventional substrate 33 and modified substrate 34 may provide the same mechanical features to optical data storage media 29 and 30, respectively. These features included backside protection, clamping area and improved mechanical stability. On the modified optical data storage medium 30, modified substrate 34 contains ridges 40 and void areas 42. On conventional optical data storage medium 29, conventional substrate 33 defines flat parallel surfaces without void areas. Since laser beam 37B focuses on data layer 38B located on the surface of substrate 34, the majority of modified substrate 34 may be non-optically functional and does not require tight adherence to optical thickness, optical thickness uniformity, and range of optical index of refraction regulations. This allows a portion of modified substrate 34 to contain ridges 40 and void areas 42 without compromising data reading or resulting in non-compliance media.

The configuration, number, and size of the void areas 42 are not limited to the embodiment shown in FIG. 2. As previously mentioned, these characteristics may be modified in order to substantially reduce inherent raw material cost while maintaining the specified physical thickness, clamping area, protection and mechanical stability of the medium. Ridges 40 have thickness 44, and void areas 42 have thickness 46. Ridge thickness 44 may be approximately equal to conventional substrate thickness 43. This allows modified optical data storage medium 30 to conform to the preexisting thickness requirements for optical data storage media. With ridge thickness 40 approximately equal to conventional substrate thickness 43, conventional substrate 33 and modified substrate 34 will both have an approximately equal maximum thickness. Therefore, modified substrate 34 complies with the maximum thickness standard. Additionally, ridge thickness 44 is greater than void thickness 42. Void thickness 42 may be approximately ten to ninety percent of conventional substrate thickness 43. Reducing void thickness 42 reduces the amount of the raw materials necessary to construct modified optical data storage medium 30 and the corresponding cost of materials.

In the case of Blu-ray disks, for example, ridge thickness 44 may be approximately equal to 1.1 millimeters, the conventional thickness of a Blu-ray substrate. Having ridge thickness 44 approximately equal to the conventional thickness of a Blu-ray substrate will allow modified optical data storage medium 30 to conform to the specified thickness requirement for Blu-ray disks. Void thickness 46 will be less than ridge thickness 44. In the case of Blu-ray disks, void thickness 46 may be approximately between 0.1 millimeters and 1.0 millimeters.

Modified substrate 34 contains substantially less material than conventional substrate 33, which defines flat parallel surfaces without void areas. Void areas 42 may cover over half of a surface of substrate 34. Consequently, approximately ten to ninety percent of conventional substrate thickness 43 may be removed from over half of a surface of substrate 34. As a result, modified substrate 34 has a much smaller volume than conventional substrate 33. For modified substrate 34, approximately ten to eighty-five percent of volume may be removed when compared to conventional substrate 33. Accordingly, a reduced amount of material is needed to construct modified substrate 34 relative to conventional substrate 33, resulting in a reduced cost of materials per modified substrate.

FIG. 2B shows the bonding between substrates 32 and 34 occurring such that void areas 42 define a pattern on the outer surface of optical data storage medium 30, yielding an outward appearance that differs from the outer appearance of conventional optical data storage medium 29. This configuration allows for uniform bonding to occur along the length of plane 36. Uniform bonding may provide advantageous thermal tolerance and corrosion-resistive properties.

Figure 3A:
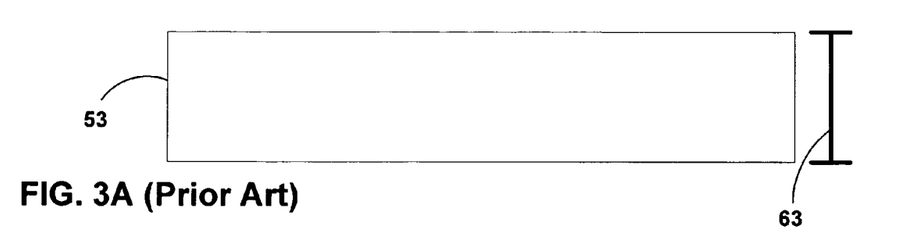
FIGS. 3A-3C are illustrations showing a thermoplastic substrate of an optical data storage medium according to the invention.
Figure 3B:
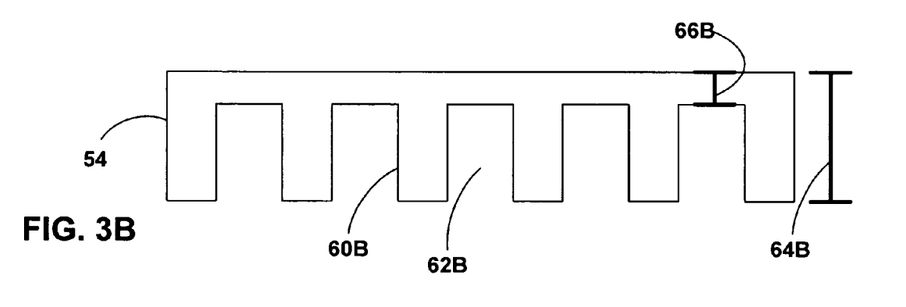
Figure 3C:
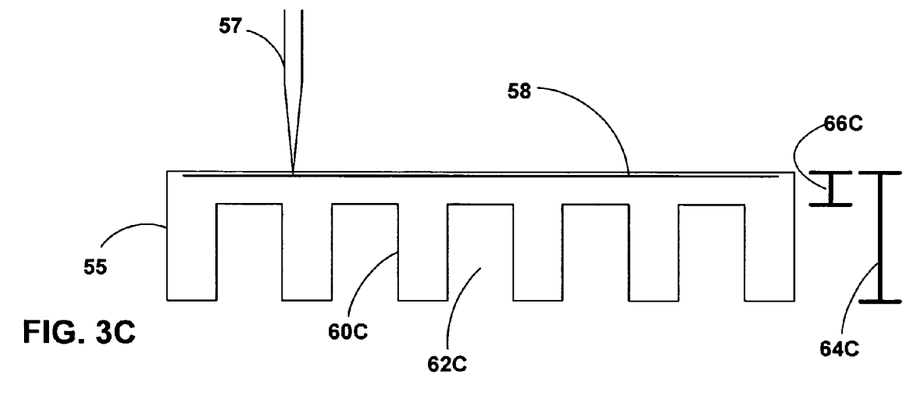

FIGS. 3A-3C are illustrations showing a thermoplastic substrate of an optical data storage medium. FIG. 3A shows the prior art structure of conventional thermoplastic substrate 53. FIGS. 3B and 3C show modified thermoplastic substrates 54 and 55. Conventional substrate 53 may provide backside protection, clamping area and improved mechanical stability. Modified substrates 54 and 55 may also provide these same features. Modified substrate 54 contains ridges 60B and void areas 62B. Conventional substrate 53 defines flat parallel surfaces without void areas. The configuration, number, and size of the void areas 62B are not limited to the embodiment shown in FIG. 3. These characteristics may be selected to substantially reduce inherent raw material cost while maintaining the specified physical thickness, clamping area, protection and mechanical stability of the medium.

Ridges 60B have thickness 64B, and void areas 62B have thickness 66B. Ridge thickness 64B may be approximately equal to conventional substrate thickness 63. This allows modified thermoplastic substrate 54 to have a maximum thickness equivalent to conventional substrate thickness 63. With ridge thicknesses 60B approximately equal to conventional substrate thickness 63, both conventional substrate 53 and modified substrates 54 will have an approximately equal maximum thickness. Therefore, modified substrate 54 complies with the preexisting maximum thickness standard. Additionally, ridge thickness 64B is greater than void thickness 66B. Void thickness 66B may be approximately ten to ninety percent of conventional substrate thickness 63. Reducing void thickness 66B reduces the amount of the raw materials necessary to construct modified thermoplastic substrate 54 and the corresponding cost of materials.

Modified substrate 54 contains substantially less material than conventional substrate 53, which defines flat parallel surfaces without void areas. Void areas 62B may cover over half of a surface of substrate 54. Consequently, approximately ten to ninety percent of conventional substrate thickness 53 may be removed from over half of a surface of substrate 54. As a result, modified substrate 54 has a much smaller volume than conventional substrate 53. For modified substrate 54, approximately ten to eighty-five percent of volume may be removed when compared to conventional substrate 53. Less material is needed to construct modified substrate 54 than conventional substrate 53, resulting in a reduced cost of materials per modified substrate.

Modified thermoplastic substrate 55 has the same structure, properties, and features of substrate 54 but also contains data layer 58. Data layer 58 may comprise multiple data layers, and each data layer may further comprise reflective, phase change, and/or dye layers. Laser beam 57 reads data layer 58. Thus, substrate 55 with data layer 58 may itself comprise a so-called air incident data storage medium, or could be adhered to other substrates to form a constructed medium. During reading, laser beam 57 focuses on data layer 58 on the surface of substrate 55. If an additional substrate is placed between the laser and data layer 58, laser beam 57 will pass through the additional substrate. Therefore, any substrate placed between the laser and data layer 58 must adhere to specified requirements in regard to optical thickness, optical thickness uniformity, allowable thickness range, and range of optical index of refraction for the material. Both substrates 54 and 55 can be bonded to additional thermoplastic substrates to form an optical data storage medium. Substrate 54 may be bonded in a manner similar to that depicted in FIGS. 1B and 1C. When bonded in this manner, substrate 54 may be a portion of a DVD or HD-DVD medium, and conventional substrate thickness 53 may be approximately 0.6 millimeters. Substrate 55 may be bonded in a manner similar to that depicted in FIG. 2B. When bonded in this manner, substrate 55 may be a portion of a Blu-ray medium, and conventional substrate thickness 53 may be approximately 1.1 millimeters. Additionally, substrate 55 may not be bonded to another thermoplastic substrate. Substrate 55 may represent an air incident optical data storage medium that does not contain additional disk layers located between the data layer and the reading laser.

When substrate 54 is bonded to another substrate such that void areas 62B define a pattern on the outer surface of an optical data storage medium (similar to the depiction shown in FIG. 1B) and also when substrate 54 is bonded to another substrate such that void areas 62B define volumetric void areas inside the medium (similar to the depiction shown in FIG. 1C), the laser beam does not pass through substrate 54 during reading of the medium. Therefore, in these configurations, substrate 54 does not require tight adherence to optical thickness, optical thickness uniformity, and range of optical index of refraction regulations. This allows modified substrates 54 to contain ridges 60B and void areas 62B without compromising data reading or resulting in non-compliance media.

When substrate 55 is bonded to another substrate such that void areas 62C define a pattern on the outer surface of an optical data storage medium (similar to the depiction shown in FIG. 2B) and also when substrate 55 is not bonded to another substrate (shown in FIG. 3C), the laser beam focuses on data layer 58 on the surface of substrate 55 during reading. The majority of modified substrate 55 may be non-optically functional and does not require tight adherence to optical thickness, optical thickness uniformity, and range of optical index of refraction regulations. This allows a portion of modified substrate 55 to contain ridges 60B and void areas 62C without compromising data reading or resulting in non-compliance media.

Modified substrates 54 and 55 may be produced by modifying the conventional injection molding process. A non-standard stamper or modified mirror block may be used to create ridge elements 60B and 60C and void areas 62B and 62C. Modified substrate 14 of FIG. 1 and modified substrate 34 of FIG. 2 may be produced in a similar manner.

To produce a modified substrate using a stamper, a master that has a surface pattern defined by the ridges and void areas of the desired modified substrate may be created. After creating a suitable master, that master may be used to make a stamper that is less fragile than the master. The stamper may be formed of electroplated metal or a hard plastic material, and has a surface pattern defined by ridges and void areas that is the inverse of the surface pattern of the master. An injection mold may use the stamper to fabricate large quantities of modified substrates. Also, photopolymer replication processes, such as rolling bead processes, may be used to fabricate replica substrates using stampers. In any case, each replica substrate may contain the ridges and void areas that were originally defined on the master surface and preserved in the stamper. Additional stampers (later generation stampers) can also be made from the first generation stamper, to improve productivity with respect to one original master, or to allow for a master surface pattern to be formed as the inverse of the desired replica substrate surface pattern.

Alternatively, a modified mirror block may be used in the injection molding process to created modified substrates. A substrate master that has a surface pattern defined by the ridges and void areas of the desired modified substrate may be created. The modified mirror block may have a surface pattern that is the inverse of the surface pattern of the master. This modified mirror block may be used in an injection mold to create modified substrates. The modified substrates produced may contain the ridges and void areas that were originally defined on the master surface.

FIGS. 4A-4F are illustrations of various ridge patterns that may be incorporated into a thermoplastic substrate of an optical data storage medium. FIG. 4 is intended to show possible ridge patterns; however, the configuration, number, and size of the ridge elements and void areas are not limited to the embodiments shown in FIG. 4. These characteristics may be modified in order to substantially reduce inherent raw material cost while maintaining the specified physical thickness, clamping area, protection and mechanical stability of the medium.

Figure 4A:
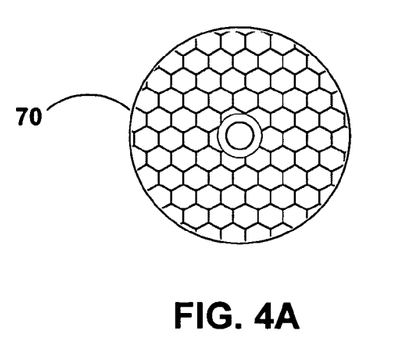
FIGS. 4A-4F are illustrations of various ridge patterns that may be incorporated into a thermoplastic substrate of an optical data storage medium according to the invention.
Figure 4B:
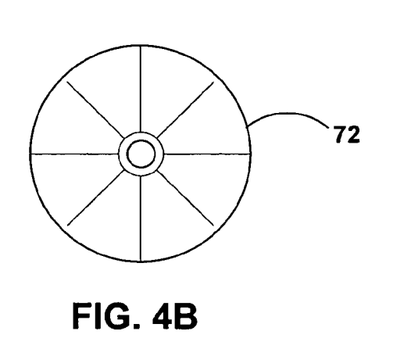
Figure 4C:
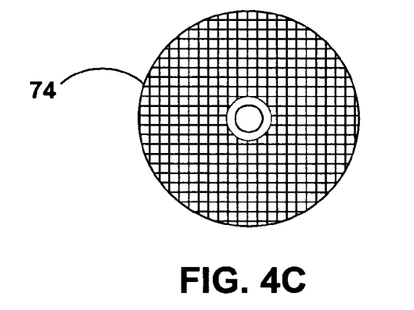
Figure 4D:
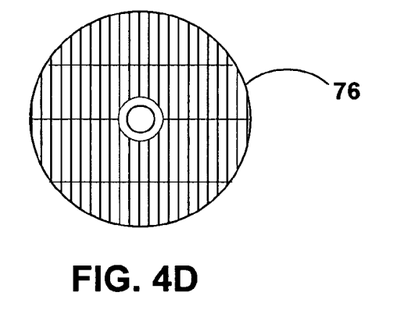
Figure 4E:
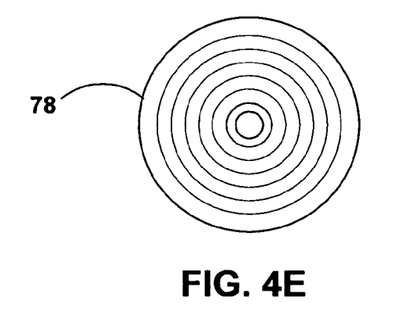
Figure 4F:
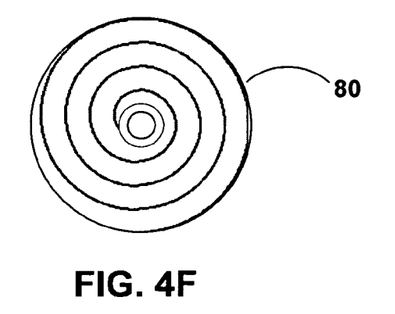

FIG. 4A illustrates a cross-sectional top view of substrate 70 exhibiting a honeycomb configuration. FIG. 4B illustrates a cross-sectional top view of substrate 72 exhibiting a series of radial elements. FIG. 4C illustrates a cross-sectional top view of substrate 74 exhibiting a checkerboard configuration. FIG. 4D illustrates a cross-sectional top view of substrate 76 exhibiting a rectangular array configuration. FIG. 4E illustrates a cross-sectional top view of substrate 78 exhibiting a series of concentric rings. FIG. 4F illustrates a cross-sectional top view of substrate 80 exhibiting a polar geometry configuration. Each of these patterns may provide advantages. As an example, radial ridges of substrate 72 shown in FIG. 4B may be used to prevent flexion. Additionally, a honeycomb configuration shown on substrate 70 of FIG. 4A may provide backside protection throughout a large portion of the medium. A checkerboard configuration shown on substrate 74 of FIG. 4C may prevent bending along two axes. A rectangular array configuration shown on substrate 76 of FIG. 4D may allow protection to be maximized along a vulnerable axis. Concentric rings of substrate 78 shown in FIG. 4E may provide lateral protection sufficient to prevent bending and provide a surface for clamping. A polar geometry configuration shown on substrate 80 of FIG. 4F may have benefits similar to those of the series of concentric circles shown on substrate 78 in FIG. 4E.

Additionally, a combination of two or more of these patterns may be desirable. For example, a series of radial elements shown on substrate 72 of FIG. 4B may be used in combination with a series of concentric rings shown on substrate 76 of FIG. 4D. More specifically, a series of radial elements may be used in combination with a first ring element around an outer perimeter of the medium and a second ring element around an inner perimeter of the medium. A ring element around the inner perimeter of the medium may provide a clamping area similar to that of a conventional optical data storage medium. A ring element around the outer perimeter of the medium may provide additional backside protection.

Alternatively, a polar configuration shown on substrate 80 of FIG. 4F may be used in combination with a rectangular array configuration shown on substrate 80 of FIG. 4F. The polar configuration may provide clamping area and lateral protection, and the rectangular configuration may provide additional protection against bending along two axes. The lateral dimension of the polar ridge may be configured to provide a clamping area similar to that of a conventional optical storage medium.

As an additional alternative, a honeycomb configuration shown on substrate 70 of FIG. 4A may be used in combination with concentric circles shown on substrate 78 of FIG. 4E. The concentric rings may provide lateral protection, and the honeycomb elements may provide additional backside protection in a variety of directions. Various patterns may be combined to improve the mechanical properties of the medium while reducing material costs. An desirable pattern may provide both lateral and radial protection.

The number of ridge elements can also be adjusted to decrease material costs while maintaining mechanical stability. For example, when using radial ridge elements shown on substrate 72 of FIG. 4B, an odd number may be used to provide better immunity to flexure weakness orientations. Additionally, the checkerboard configuration shown on substrate 74 of FIG. 4C and rectangular array configuration shown on substrate 76 of FIG. 4D may be selected to use the fewest number of ridge elements that allow the medium to maintain its mechanical properties. The thickness of each element and the area between each series of elements may be considered when determining the ideal number of elements. The dimensions of each ridge element can also be adjusted to select the desired medium properties. For example, the lateral dimension of a polar configuration shown on substrate 80 of FIG. 4F may be selected. A polar configuration may have a large lateral dimension around the inner perimeter of the medium to allow for clamping, and the lateral dimension may decrease toward the outer perimeter of the medium. In general, the number, dimensions, and configuration of ridge elements may all be adjusted in order to minimize the amount of material while maintaining mechanical stability Various embodiments of the invention have been described. These and other embodiments are within the scope of the following claims.

The invention claimed is:

1. An optical data storage medium comprising:
a first thermoplastic polycarbonate substrate defining a first side and a second side; and
a second thermoplastic polycarbonate substrate defining a first side and a second side,
wherein the first side of the first thermoplastic polycarbonate substrate is incident to a laser when the medium is read through the first thermoplastic polycarbonate substrate, the second side of the first thermoplastic polycarbonate substrate defines an information bearing surface that is read through the first thermoplastic polycarbonate substrate, and the second side of the second thermoplastic polycarbonate substrate includes one or more substantial void areas wherein the substantial void areas are configured such that approximately ten to eighty-five percent of a volume of the second thermoplastic polycarbonate substrate is removed relative to a substrate that defines flat parallel surfaces without the void areas.

2. The optical data storage medium of claim 1, wherein the second side of the first thermoplastic polycarbonate substrate is bonded to the first side of the second thermoplastic polycarbonate substrate such that the second side of the second thermoplastic polycarbonate substrate defines an outer surface of the medium and the void areas define a pattern on the outer surface.

3. The optical data storage medium of claim 1, wherein the second side of the first thermoplastic polycarbonate substrate is bonded to the second side of the second thermoplastic polycarbonate substrate such that the void areas define volumetric void areas inside the medium.

4. The optical data storage medium of claim 1, wherein the second side of the second thermoplastic polycarbonate substrate comprises:
a plurality of ridge elements,
wherein the plurality of ridge elements are arranged in one or more patterns,
wherein the one or more patterns are selected from the following group: a series of radial elements, a honeycomb configuration, a checker board configuration, a rectangular array configuration, a series of concentric rings, and a polar geometry configuration.

5. The optical data storage medium of claim 4, wherein the plurality of ridge elements define a thickness of a 0.6 millimeter substrate, and the void areas define a thickness of approximately ten to eighty-five percent of the thickness of the 0.6 millimeter substrate.

6. The optical data storage medium of claim 1, wherein approximately fifteen to ninety percent of a thickness of the second thermoplastic polycarbonate substrate is removed from greater than fifty percent of the second thermoplastic polycarbonate surface relative to the substrate that defines flat parallel surfaces without the void areas.

7. The optical data storage medium of claim 1, wherein approximately ten to eighty-five percent of a volume of the second thermoplastic polycarbonate substrate is removed relative to the substrate that defines flat parallel surfaces without the void areas.

8. The optical data storage medium of claim 1, wherein the medium conforms to a standard selected from the following group: a DVD standard and an HD-DVD standard.

9. An optical data storage medium comprising:
a first thermoplastic substrate defining a first side and a second side, wherein the first thermoplastic substrate is approximately 0.1 millimeter thick; and
a second thermoplastic substrate defining a first side and a second side, wherein the second thermoplastic substrate is approximately 1.1 millimeters thick,
wherein the first side of the first substrate is incident to a laser when the medium is read through the first substrate, the first side of the second thermoplastic substrate defines an information bearing surface that is read through the first substrate, and the second side of the second thermoplastic substrate includes one or more substantial void areas, wherein the second surface of the first substrate is bonded to the first surface of the second substrate such that the second side of the second substrate defines an outer surface of the medium and the substantial void areas define a pattern on the outer surface, wherein the substantial void areas are configured such that approximately ten to eighty-five percent of a volume of the second thermoplastic substrate is removed relative to a substrate that defines flat parallel surfaces without the void areas.

10. The optical data storage medium of claim 9, wherein the second side of the second substrate comprises:
a plurality of ridge elements,
wherein the plurality of ridge elements are arranged in one or more patterns,
wherein the one or more patterns are selected from the following group: a series of radial elements, a honeycomb configuration, a checker board configuration, a rectangular array configuration, a series of concentric rings, and a polar geometry configuration.

11. The optical data storage medium of claim 10, wherein the plurality of ridge elements define a thickness of a 1.1 millimeter substrate, and the void areas define a thickness of approximately ten to ninety percent of the thickness of the 1.1 millimeter substrate.

12. The optical data storage medium of claim 9, wherein approximately ten to ninety percent of a thickness of the second substrate is removed from greater than fifty percent of the second surface relative to the substrate that defines flat parallel surfaces without the void areas.

13. The optical data storage medium of claim 9, wherein the medium conforms to a Blu-Ray standard and the first substrate comprises a cover layer.

14. A thermoplastic polycarbonate substrate of an optical data storage medium defining a first side and a second side, wherein the second side includes one or more substantial void areas, wherein approximately ten to eighty-five percent of a volume of the thermoplastic polycarbonate substrate is removed relative to a substrate that defines flat parallel surfaces without the void areas.

15. The thermoplastic polycarbonate substrate of claim 14, wherein the first side defines an information bearing surface.

16. The thermoplastic polycarbonate substrate of claim 14, wherein the second side of the substrate comprises:
a plurality of ridge elements,
wherein the plurality of ridge elements are arranged in one or more patterns, wherein the one or more patterns are selected from the following group: a series of radial elements, a honeycomb configuration, a checker board configuration, a rectangular array configuration, a series of concentric rings, and a polar geometry configuration.

17. The thermoplastic polycarbonate substrate of claim 16, wherein approximately ten to ninety percent of a thickness of the thermoplastic polycarbonate substrate is removed from greater than filly percent of the second surface relative to the substrate that defines flat parallel surfaces without the void areas.

18. An optical data storage medium including a thermoplastic substrate, wherein a first side of the substrate is incident to a laser when the medium is read through the substrate by a drive system, and a second side of the substrate defines an information bearing surface that is read through the substrate, wherein the optical data storage medium comprises a substantially reduced volume of thermoplastic material relative to a digital versatile disk (DVD) that includes two bonded thermoplastic substrates such that approximately ten to eighty-five percent of a volume of the thermoplastic substrate is removed relative to a substrate that defines flat arallel surfaces without the substantially reduced volume, and wherein the optical data storage medium defines a ring element formed at an inner perimeter of the optical data storage medium that defines a clamping area of the optical data storage medium for the drive system.

19. The optical data storage medium of claim 18, wherein the optical data storage medium further comprises another ring element formed at an outer perimeter of the optical data storage medium.

20. The optical data storage medium of claim 19, wherein the optical data storage medium further comprises a plurality of radial elements that extend from the ring element formed at the inner perimeter to the ring element formed at the outer perimeter.

21. An optical data storage medium comprising:
a thermoplastic substrate defining a first side and a second side;
a cover layer formed over the first side of the thermoplastic substrate;
wherein the cover layer is incident to a laser when the medium is read through the cover layer, the first side of the thermoplastic substrate defines an information bearing surface that is read through the cover layer, and the second side of the thermoplastic substrate includes one or more substantial void areas, wherein the substantial void areas are configured such that approximately ten to eighty-five percent of a volume of the thermoplastic substrate is removed relative to a substrate that defines flat parallel surfaces without the void areas.

22. The optical data storage medium of claim 21, wherein the cover layer comprises another thermoplastic substrate.

23. The optical data storage medium of claim 21, wherein the medium substantially conforms to a Blu-Ray standard and the cover layer defines a thickness of approximately 0.1 millimeters.

24. An optical data storage medium comprising:
a first thermoplastic substrate defining a first side and a second side; and
a second thermoplastic substrate defining a first side and a second side,
wherein the first side of the first thermoplastic substrate is incident to a laser when the medium is read through the first thermoplastic substrate, the second side of the first thermoplastic substrate is bonded to the first side of the second thermoplastic substrate, and the second side of the second thermoplastic substrate includes one or more substantial void areas, wherein the substantial void areas are configured such that approximately ten to eighty-five percent of a volume of the second thermoplastic substrate is removed relative to a substrate that defines flat parallel surfaces without the void areas.

25. The optical data storage medium of claim 24, wherein the second side of the first thermoplastic substrate defines an information bearing surface that is read through the first thermoplastic substrate.

26. The optical data storage medium of claim 24, wherein the first side of the second thermoplastic substrate defines an information bearing surface that is read through the first thermoplastic substrate.

27. The optical data storage medium of claim 24, wherein an information bearing surface is encased between the first and second thermoplastic substrates, and the information bearing surface is read through the first thermoplastic substrate.

28. The optical data storage medium of claim 24, wherein the second side of the first thermoplastic substrate is bonded to the first side of the second thermoplastic substrate such that the second side of the second thermoplastic substrate defines an outer surface of the medium and the void areas define a pattern on the outer surface.

\* \* \* \* \*